US 7,903,955 B2

(12) United States Patent
Hsu et al.

(10) Patent No.: US 7,903,955 B2
(45) Date of Patent: Mar. 8, 2011

(54) MOTOR DRIVING DEVICE

(75) Inventors: Chi-Lin Hsu, Taipei County (TW);
En-Hsun Hsiao, Taipei County (TW);
Meng-Hsun Lee, Taipei County (TW)

(73) Assignee: Princeton Technology Corporation, Taipei County (TW)

( * ) Notice: Subject to any disclaimer, the term of this patent is extended or adjusted under 35 U.S.C. 154(b) by 466 days.

(21) Appl. No.: 12/068,429

(22) Filed: Feb. 6, 2008

(65) Prior Publication Data
US 2008/0317444 A1   Dec. 25, 2008

(30) Foreign Application Priority Data
Jun. 21, 2007  (TW) ................................ 96122309 A

(51) Int. Cl.
*H02P 7/29*   (2006.01)
(52) U.S. Cl. .................... 388/815; 388/811; 318/400.06; 318/400.22; 318/471
(58) Field of Classification Search ............. 318/400.06, 318/400.22, 471; 388/811, 815
See application file for complete search history.

(56) References Cited

U.S. PATENT DOCUMENTS
4,486,692 A  *  12/1984  Sonoda et al. ................ 318/258
* cited by examiner

*Primary Examiner* — Bentsu Ro
*Assistant Examiner* — Erick Glass
(74) *Attorney, Agent, or Firm* — Muncy, Geissler, Olds & Lowe, PLLC

(57) ABSTRACT

A driving device is provided for controlling rotation of a motor. The driving device comprises an inputting module, a comparing module and a processing module. The inputting module includes a first current source, a first voltage source and a first capacitance. The first capacitance is coupled between the first current source and the first voltage source for charging/discharging and generating a voltage signal. The comparing module is coupled to the inputting module for comparing a selecting signal with the voltage signal and generating a comparing signal. The processing module is coupled to the comparing module and generates a control signal according to a clock signal and the comparing signal, wherein the driving device controls the rotation of the motor by the control signal.

20 Claims, 3 Drawing Sheets

MOTOR DRIVING DEVICE

BACKGROUND OF THE INVENTION

1. Field of the Invention

The invention relates to a driving device, and more particularly to a driving device for controlling the rotation of a single phase motor.

2. Description of the Related Art

Heat generated in a computer raises proportionally to increase in power requirements of the components inside of the computer. Among them, the central processing unit (CPU) generates the most heat. When the number of the transistors in a CPU increased from about one hundred thousand in the 386 generation CPU to about fifty million in the Pentium 4 generation CPU, the surface temperature of the CPU reached 50-80° C., and the temperature inside of the CPU reached 80° C. on average, and sometimes even 100° C. Thus, requirements for heat dissipation of a CPU have increased, and several types of heat dissipation systems for computers have been developed. Among the developments, the motor controlled fan is the most popular one used for heat dissipation.

Conventionally, the speed of a fan is controlled according to the driving current provided by the motor control device. Different levels of driving current, drives different fan speeds. Accordingly, different heat dissipation results can be achieved. Thus, accurately generating driving current to appropriately drive motor speed and efficiently providing the best heat dissipation results according to the temperature of electrical components, have become the most important topic in the heat dissipation field.

BRIEF SUMMARY OF THE INVENTION

A driving device is provided for controlling rotation of a motor. The driving device comprises an inputting module, a comparing module and a processing module. The inputting module includes a first current source, a first voltage source and a first capacitance. The first capacitance is coupled between the first current source and the first voltage source for charging/discharging and generating a voltage signal. The comparing module is coupled to the inputting module for comparing a selecting signal with the voltage signal and generating a comparing signal. The processing module is coupled to the comparing module and generates a control signal according to a clock signal and the comparing signal, wherein the driving device controls the rotation of the motor by the control signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
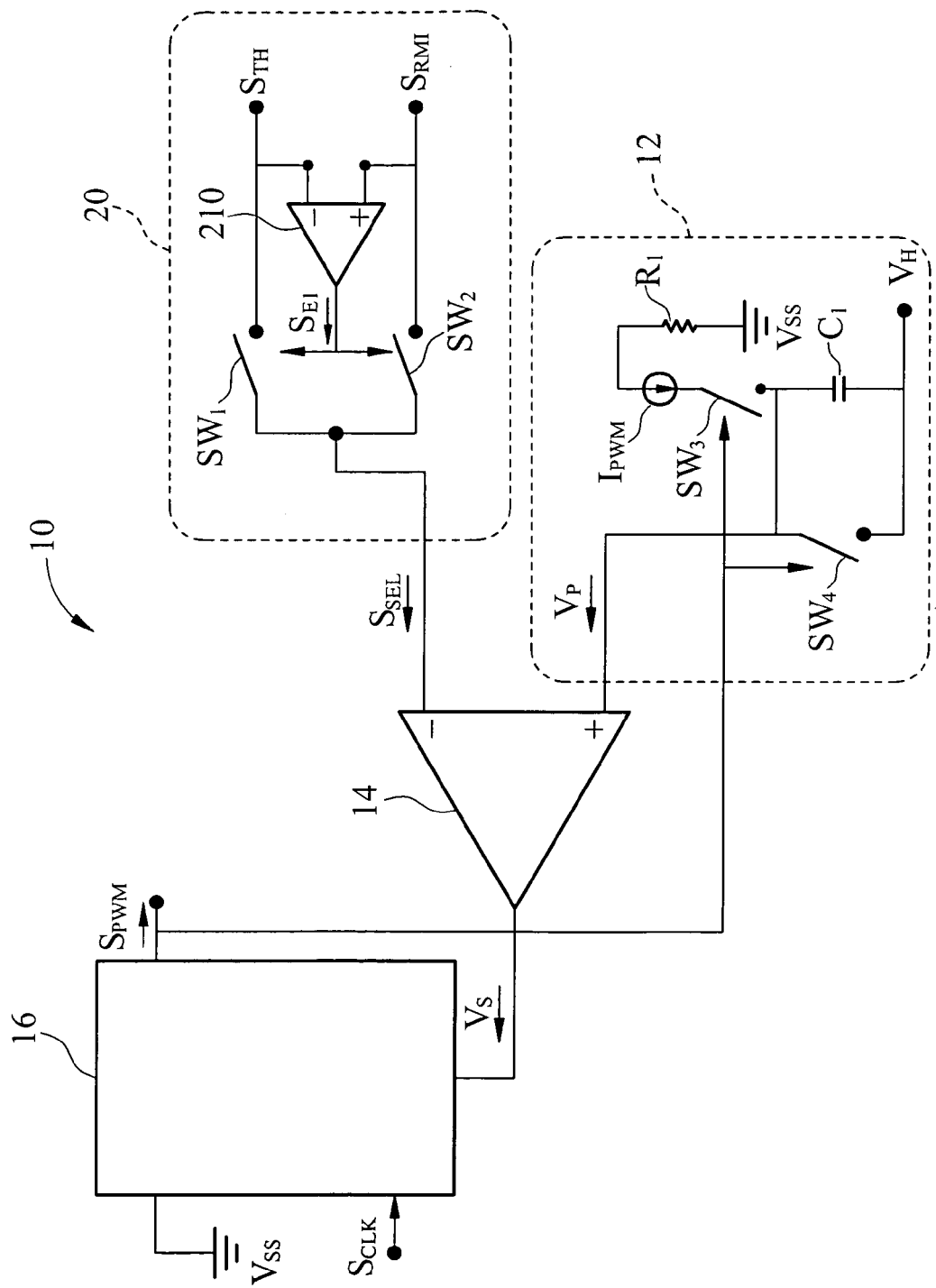
FIG. 1 is a block diagram of a driving device according to one embodiment of the invention.
Figure 2:
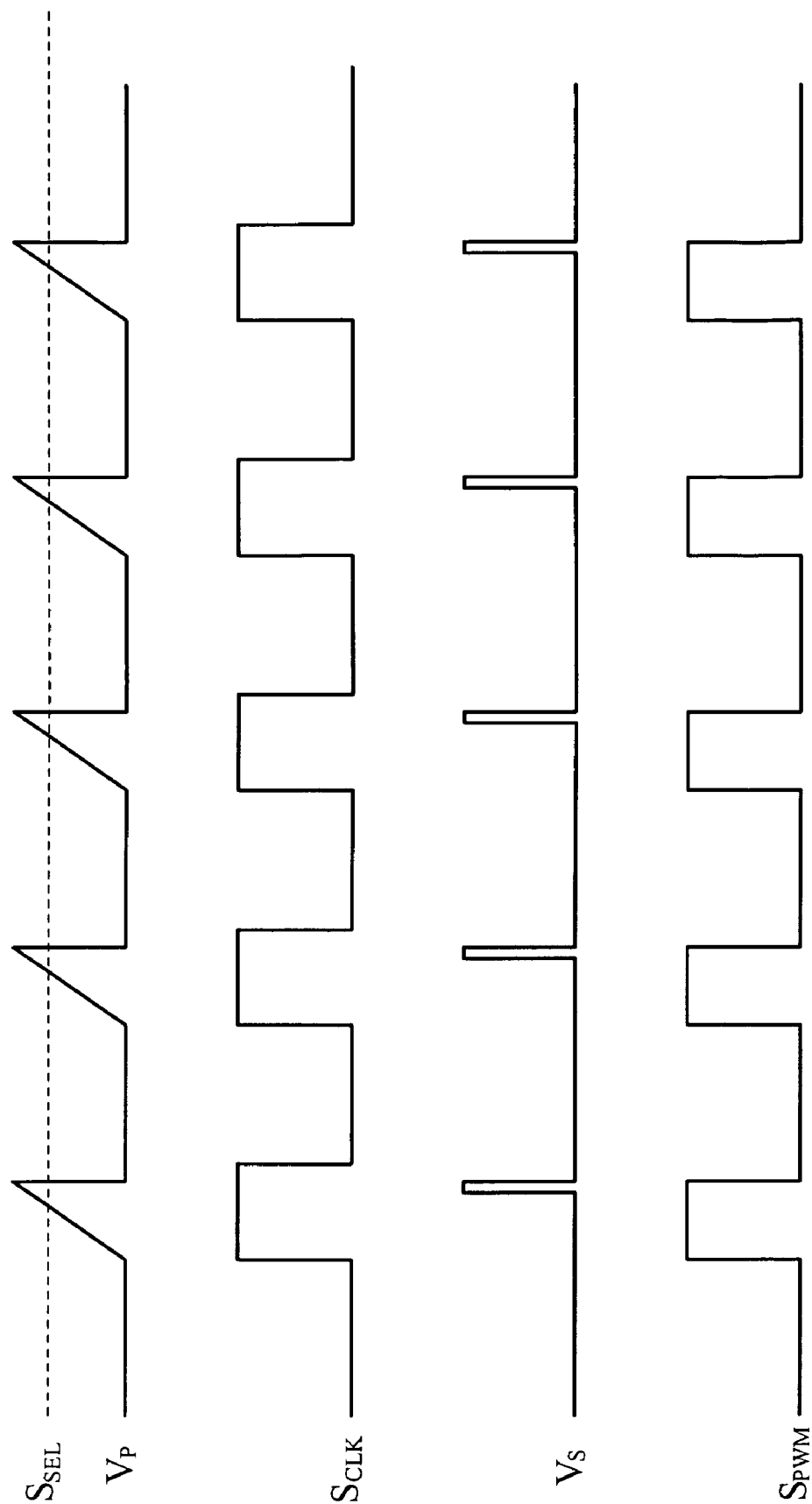
FIG. 2 illustrates the waveforms of signals of the driving device according to the embodiment of the invention.

Please refer to FIG. 1 and FIG. 2. FIG. 1 is a block diagram of a driving device according to one embodiment of the invention. FIG. 2 illustrates the waveforms of signals of the driving device according to the embodiment of the invention. As shown in FIG. 1 and FIG. 2, a driving device 10 for controlling the rotation of a motor (not shown) comprises an input module 12, a comparing module 14, and a processing module 16. The input module 12 comprises a first current source $I_{PWM}$, a first voltage source $V_H$, and a first capacitance $C_1$. The first capacitance $C_1$ is coupled between the first current source $I_{PWM}$ and the first voltage source $V_H$. The first capacitance $C_1$ is used for charging or discharging and generating a voltage signal $V_P$. The comparing module 14 is coupled to the input module 12 for comparing a selecting signal $S_{SEL}$ with the voltage signal $V_P$, and generating a comparing signal $V_S$. The processing module 16 is coupled to the comparing module 14 and generates a control signal $S_{PWM}$ according to a clock signal $S_{CLK}$ and the comparing signal $V_S$, wherein the driving device 10 controls the rotation of the motor (not shown) by the control signal $S_{PWM}$. In the embodiment, comparing module 14 is a comparator, and the driving device 10 is installed in an integrated circuit. In addition, the motor (not shown) is a single phase motor.

The driving device 10 of the embodiment further comprises a selecting module, 20 coupled to the comparing module 14 for generating the selecting signal $S_{SEL}$. The selecting module 20 comprises a first comparator 210, a first switch $SW_1$, and a second switch $SW_2$. The first comparator 210 compares a first input signal $S_{TH}$ with a second input signal $S_{RMI}$, and generates a first comparing signal $S_{E1}$. The first switch $SW_1$ is coupled to an input of the first comparator 210 for selectively transmitting the first input signal $S_{TH}$ by turning on or off according to the first comparing signal $S_{E1}$. The second switch $SW_2$ is coupled to another input of the first comparator 210 for selectively transmitting the second input signal $S_{RMI}$ by turning on or off according to the first comparing signal $S_{E1}$. The selecting module 20 generates the selecting signal $S_{SEL}$ according to the first input signal $S_{TH}$ and the second input signal $S_{RMI}$. The selecting signal $S_{SEL}$ is one of the first input signal $S_{TH}$ or the second input signal $S_{RMI}$.

According to one embodiment of the invention, the first input signal $S_{TH}$ is a detected temperature voltage corresponding to an environmental temperature outside of the driving device 10, and the second input signal $S_{RMI}$ is a preset driving voltage corresponding to the lowest rotation speed of the motor (not shown). When the first switch $SW_1$ is turned on, the selecting signal $S_{SEL}$ is the first input signal $S_{TH}$, and when the second switch $SW_2$ is turned on, the selecting signal $S_{SEL}$ is the second input signal $S_{RMI}$. In one embodiment of the invention, when the first comparator 210 compares the first input signal $S_{TH}$ with the second input signal $S_{RMI}$, and outputs the first comparing signal $S_{E1}$ representing the comparing result "1", the first switch $SW_1$ will be turned ON and the second switch $SW_2$ will be turned OFF. At this time, the first input signal $S_{TH}$ representing the environmental temperature will be input to the comparing module 14. And when the first comparing signal $S_{E1}$ is "0", the second switch $SW_2$ will be turned ON and the first switch $SW_1$ will be turned OFF. At this time, the second input signal $S_{RMI}$ representing the lowest speed of the rotation of the motor (not shown) will be input to the comparing module 14 for processing.

In addition, the input module 12 further comprises a third switch $SW_3$ coupled between the first current source $I_{PWM}$ and the first capacitance $C_1$, wherein the third switch $SW_3$ controls the first capacitance $C_1$ to charge or discharge by selectively turning on or off according to the control signal $S_{PWM}$. In addition, the input module 12 further comprises a fourth switch $SW_4$ coupled between the first voltage source $V_H$ and the comparing module 14. The fourth switch $SW_4$ controls whether to bypass the first capacitance $C_1$ or not, by selectively turning on or off according to the control signal $S_{PWM}$.

The amount of the first current source $I_{PWM}$ can be adjusted according to different applications. In one embodiment of the present invention, the input module 12 further comprises a first resistor $R_1$ coupled between the first current source $I_{PWM}$ and a ground Vss. By adjusting the resistance of the first resistor $R_1$, the amount of the first current source $I_{PWM}$ is adjusted accordingly, and the charging/discharging time of the first capacitance $C_1$ is further adjusted. In one embodiment, the processing module 16 is a flip-flop.

Please refer to FIG. 1 and FIG. 2, FIG. 2 illustrates the waveforms of signals of the driving device according to the embodiment of the invention. In the following, the processing of the driving device 10 will be discussed according to the waveforms shown in FIG. 2. As shown in FIG. 1 and FIG. 2, input module 12 controls the third switch $SW_3$ and $SW_4$ turning on or off respectively corresponding to the control signal $S_{PWM}$ generated according to the clock signal $S_{CLK}$ and the comparing signal $V_S$. As shown in FIG. 2, the rising edge of the control signal $S_{PWM}$ aligns with the rising edge of the clock signal $S_{CLK}$, and the falling edge of the control signal $S_{PWM}$ aligns with the falling edge of the comparing signal $V_S$. To begin, the first comparator 210 compares a first input signal $S_{TH}$ with a second input signal $S_{RMI}$, and controls the first switch $SW_1$ and $SW_2$ according to the comparing result for selectively transmitting the first input signal $S_{TH}$ or the second input signal $S_{RMI}$ to the comparing module 14. Also, the control signal $S_{PWM}$ generated by processing module 16 is "0". When the clock signal $S_{CLK}$ is turned to "1", the corresponding control signal $S_{PWM}$ changes from "0" to "1". At this time, the third switch $SW_3$ is turned on and forces the voltage signal $V_p$ to be charged through the voltage level of the first voltage source $V_H$. The comparing module 14 keeps comparing the voltage signal $V_p$ with the first input signal $S_{TH}$ or the second input signal $S_{RMI}$ until the voltage signal $V_p$ is larger than the first input signal $S_{TH}$ or the second input signal $S_{RMI}$. That is, when the comparing signal $V_S$ is "1", the control signal $S_{PWM}$ changes from "1" to "0". At this time, the control signal $S_{PWM}$ turns off the third switch $SW_3$ and turns on the fourth switch $SW_4$. Under such conditions, the first capacitor $C_1$ begins to discharge until the voltage signal $V_P$ equals to the voltage $V_H$.

Figure 3:
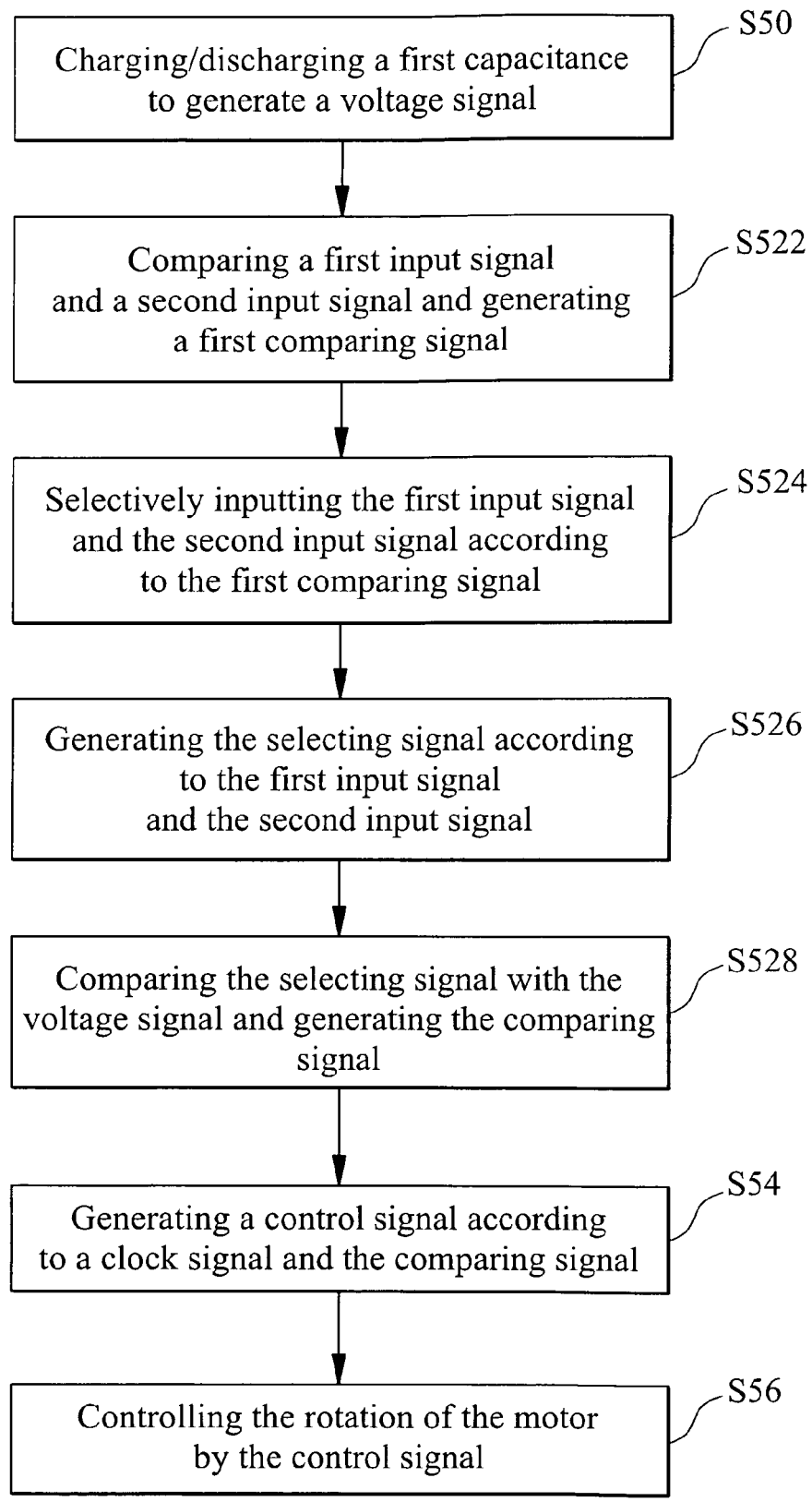
FIG. 3 illustrates the flow chart of the driving method according to the embodiment of the invention.

Please refer to the FIG. 3, FIG. 3 illustrates the flow chart of the driving method according to the embodiment of the invention. As shown in FIG. 3, this embodiment is a driving method for controlling a rotation of a motor, wherein the motor is a single phase motor. The driving method comprises.

S50: a first capacitance is charged or discharged to generate a voltage signal. In this embodiment, a first input signal is a detected temperature voltage corresponding to an environmental temperature outside of the motor, and a second input signal is a preset driving voltage corresponding to the lowest speed of the rotation of the motor. In this step, the voltage signal is generated by selectively charging or discharging the first capacitance according to a control signal. In another embodiment, the voltage signal is generated by controlling whether to bypass the first capacitance or not according to the control signal.

S52: a selecting signal is compared with the voltage signal and a comparing signal is generated, wherein step S52 further comprises:

S522: a first input signal and a second input signal are compared, and a first comparing signal is generated accordingly;

S524: the first input signal and the second input signal are selectively input according to the first comparing signal;

S526: the selecting signal is generated according to the first input signal and the second input signal, wherein the selecting signal is one of the first input signal and the second input signal;

S528: the selecting signal is compared with the voltage signal and the comparing signal is generated; and S54: a control signal is generated according to a clock signal and the comparing signal; and S56: the rotation of the motor is controlled by the control signal.

The driving device according to the embodiment of the invention as discussed above controls the speed of the rotation of a motor according to the duty cycle of the control signal generated on its own. For example, when the control signal is HIGH, the driving device continuously inputs current into the signal phase motor, thus the speed of the motor is increased. In this way, the speed of the motor is controlled. Furthermore, the control signal generated by comparing the first input signal and the second input signal controls the motor according to the condition of the environment outside of the driving device, or directs the single phase motor to rotate at the lowest speed, so as to achieve optimized heat dissipation results.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and theirs equivalents.

What is claimed is:

1. A driving device for controlling a rotation of a motor, comprising:
    an input module comprising:
        a first current source;
        a first voltage source; and
        a first capacitance coupled between the first current source and the first voltage source for charging/discharging and generating a voltage signal;
    a selecting module generating selecting signal according to a first input signal and a second input signal;
    a comparing module coupled to the input module for comparing the selecting signal with the voltage signal, and generating a comparing signal; and
    a processing module coupled to the comparing module and generating a control signal according to a clock signal and the comparing signal, wherein the driving device controls the rotation of the motor by the control signal.

2. The driving device as claimed in claim 1,
    wherein the selecting module is coupled to the comparing module and comprises:
    a first comparator for comparing the first input signal with the second input signal and generating a first comparing signal;
    a first switch coupled to an input of the first comparator for selectively transmitting the first input signal by turning on or off according to the first comparing signal; and
    a second switch coupled to another input of the first comparator for selectively transmitting the second input signal by turning on or off according to the first comparing signal, wherein the selecting module outputs one of the first input signal and the second input signal as the selecting signal.

3. The driving device as claimed in claim 2, wherein the selecting signal is one of the first input signal or the second input signal.

4. The driving device as claimed in claim 3, wherein the selecting signal is the first input signal when the first switch is turned on, and the selecting signal is the second input signal when the second switch is turned on.

5. The driving device as claimed in claim 3, wherein the first input signal is a detected temperature voltage corresponding to an environmental temperature outside of the driving device.

6. The driving device as claimed in claim 3, wherein the second input signal is a preset driving voltage corresponding to the lowest speed of the rotation of the motor.

7. The driving device as claimed in claim 1, wherein the input module further comprises a third switch coupled between the first current source and the first capacitance, and the third switch controls the charge/discharge of the first capacitance by selectively turning on or off according to the control signal.

8. The driving device as claimed in claim 7, wherein the input module further comprises a fourth switch coupled between the first voltage source and the comparing module, and the fourth switch controls whether to bypass the first capacitance or not by selectively turning on or off according to the control signal.

9. The driving device as claimed in claim 1, wherein the input module further comprises a first resistor coupled between the first current source and a ground for adjusting the first current source.

10. The driving device as claimed in claim 1, wherein the processing module is a flip-flop, and the comparing module is a comparator.

11. The driving device as claimed in claim 1, wherein the driving device is installed in an integrated circuit.

12. The driving device as claimed in claim 1, wherein the motor is a single phase motor.

13. A driving method for controlling a rotation of a motor, comprising:
(a) charging/discharging a first capacitance to generate a voltage signal;
(b) comparing a selecting signal with the voltage signal and generating a comparing signal;
(c) generating a control signal according to a clock signal and the comparing signal; and
(d) controlling the rotation of the motor by the control signal,
wherein the selecting signal is generated according to a first input signal and a second input signal.

14. The driving method as claimed in claim 13, wherein the step (b) further comprises:
(b1) comparing the first input signal and the second input signal and generating a first comparing signal;
(b2) selectively transmitting the first input signal and the second input signal according to the first comparing signal; and
(b3) outputting one of the first input signal and the second input signal as the selecting signal.

15. The driving method as claimed in claim 14, wherein the selecting signal is one of the first input signal or the second input signal.

16. The driving method as claimed in claim 14, wherein the first input signal is a detected temperature voltage corresponding to an environmental temperature outside of the motor.

17. The driving method as claimed in claim 14, wherein the second input signal is a preset driving voltage corresponding to the lowest speed of the rotation of the motor.

18. The driving method as claimed in claim 14, wherein in the step (a), the voltage signal is generated by selectively charging/discharging the first capacitance according to the control signal.

19. The driving method as claimed in claim 14, wherein in the step (a), the voltage signal is generated by controlling whether to bypass the first capacitance or not according to the control signal.

20. The driving method as claimed in claim 14, wherein the motor is a single phase motor.

* * * * *